United States Patent

Finkeldei et al.

[11] Patent Number: 6,148,861
[45] Date of Patent: Nov. 21, 2000

[54] MULTIWAY VALVE FOR FLUIDS AND ITS USE

[75] Inventors: Ferdinand Finkeldei, Frankfurt am Main; Walter Schnaus, Rodenbach; Paul Tersi, Altenstadt, all of Germany

[73] Assignee: Lurgi Zimmer Aktiengesellschaft, Frankfurt am Main, Germany

[21] Appl. No.: 09/418,149

[22] Filed: Oct. 14, 1999

[30] Foreign Application Priority Data

Nov. 5, 1998 [DE] Germany ............... 198 50 921

[51] Int. Cl.⁷ .................................... F16K 11/20
[52] U.S. Cl. ................................ 137/872; 137/883
[58] Field of Search ............................ 137/872, 873, 137/883

[56] References Cited

U.S. PATENT DOCUMENTS

| 4,081,231 | 3/1978 | Herrington | 137/872 |
| 4,506,704 | 3/1985 | Boom et al. | 137/872 |

FOREIGN PATENT DOCUMENTS

| 1550353 | 9/1969 | Germany | 137/883 |
| 2125942 | 3/1984 | United Kingdom | 137/872 |

*Primary Examiner*—John Fox
*Attorney, Agent, or Firm*—McDonnell Boehnen Hulbert & Berghoff

[57] ABSTRACT

The present invention comprises a multiway valve for fluids, consisting of an inlet line (1), a connector housing (9), basic valve bodies (2, 3) and additional valve bodies (25, 26, 26') branching off from the connector housing (9), with each of the valve bodies (2, 3, 25, 26, 26') having a valve housing (10) designed as a guide cylinder with a lateral discharge outlet (4) opening into the respective outlet line (5), with a valve spindle (13, 13a) movable in the axial direction within the guide cylinder with a valve head (12, 12a) engaging in a valve seat (6) in the connector housing (9) in the closed position of the respective valve body, as well as the use of this multiway valve.

The basic valve bodies (2, 3) have a valve head lantern (17, 18) in the form of a straight cylinder (17) with an attached, straight cylinder (18) cropped at an inclined angle. The valve head (12a) of each additional valve body (25, 26, 26') has a cylindrical attachment with a front surface that forms a cavity curved inwards like the inner surface of a cylinder section, and a gable-roofed shaped wedge or a cone arranged flush to the front surface within said cavity.

16 Claims, 4 Drawing Sheets

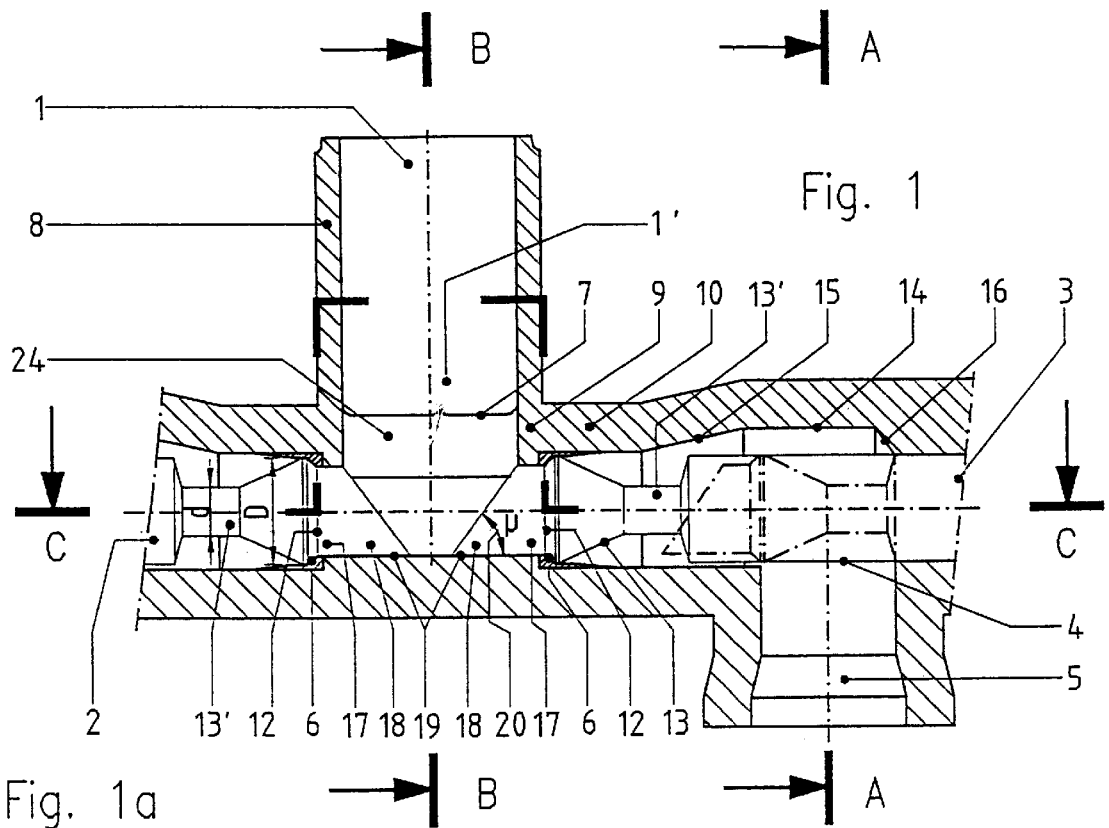
Fig. 1
Fig. 1a
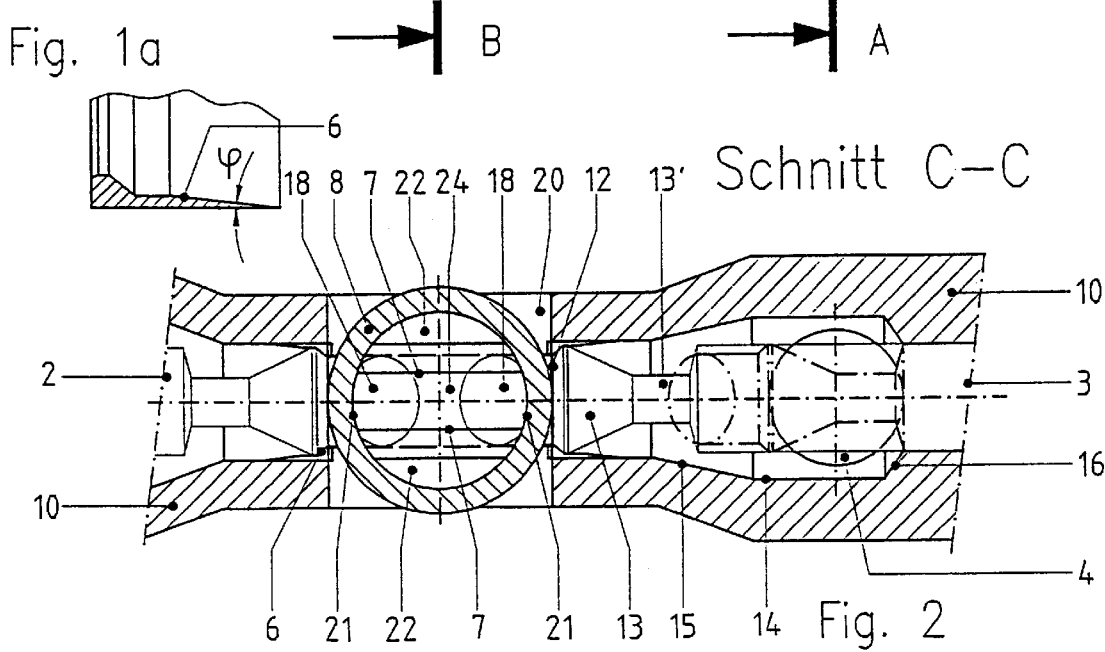
Schnitt C-C
Fig. 2

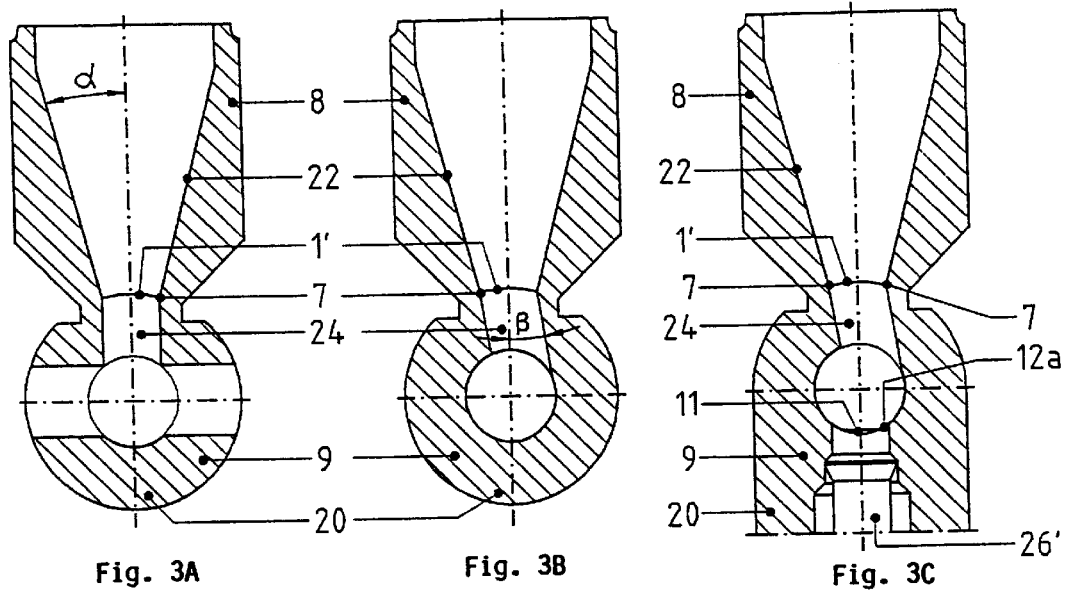
Schnitt B—B    Fig. 3
Fig. 3A    Fig. 3B    Fig. 3C
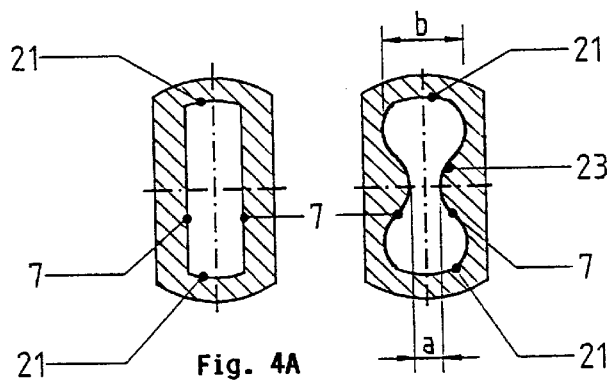
Fig. 4
Fig. 4A    Fig. 4B
Schnitt A—A
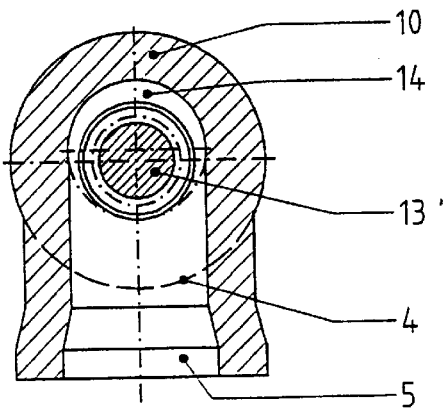
Fig. 5

Schnitt D-D

Schnitt B-B

/ 1

MULTIWAY VALVE FOR FLUIDS AND ITS USE

BACKGROUND OF THE INVENTION

1. Field of Invention

This invention concerns a multiway valve for fluids consisting of an inlet line and a plurality of valve bodies branching off from a connector housing, with each valve body having a valve housing defining a guide cylinder with a lateral discharge outlet opening into the respective outlet line, and an axially movable valve spindle within this valve housing with a valve head engaging in a valve seat arranged in said connector housing in the closed position of the respective valve body; this invention also concerns the use of this multiway valve.

2. Summary of the Related Art

Multiway valves for viscous fluids are known. Production and processing of polymer melts or other viscous fluids usually requires that the fluid stream be divided into substreams, such as when several processing positions are connected and/or when a portion of the polymer is to be chemically modified or processed into different products. The flow division takes place by using traditional multiway valves, but these often have the disadvantage of having "dead zones" (i.e., areas where a viscous fluid flows only at a reduced rate). In these dead zones, there may be a complete interruption in flow so that some of the viscous fluid remains in the dead zones of the multiway valve. To maintain the flowability of polymer melts, high temperatures are necessary, but with a prolonged dwell time of a portion of the polymer in the dead zones, these temperatures lead to decomposition of the polymer into insoluble, crosslinked products. Even with otherwise viscous fluids, a partially prolonged dwell time usually has a negative effect on quality because it results in decomposition products being deposited in the viscous fluid, leading directly to damage to the subsequent product.

European Patent Application No. 615,006 A describes a distributor for viscous fluids, consisting of a fluid line and several valves connected to the fluid line, with each valve having a housing with a portion designed as a guide cylinder, an outlet opening into an outlet line, and a valve spindle movable in the guide cylinder between the open valve position and the closed valve position and having a valve head with a mushroom-shaped attachment. These valves have only few dead zones, however, the fluid line must be flushed continually with the fluid, which must be recycled, and is additionally stressed by this recycling.

SUMMARY OF THE INVENTION

The present invention is a multiway valve for high viscosity fluids that prevents the development of low flow zones oder dead zones. Consequently, problematic decomposition products due to interruptions in flow do not occur.

BRIEF DESCRIPTION OF THE DRAWINGS

FIG. 1 shows the multiway valve with the basic valve bodies in cross section, and FIG. 1A shows an enlarged cross section of the valve seat.

FIG. 2 shows the multiway valve with the basic valve bodies according to section C—C in FIG. 1.

FIG. 3 shows the multiway valve according to section B—B in FIG. 1 in three embodiments with a straight and inclined flow channel.

FIG. 4 shows the flow cross section at the outlet of the inlet line with and without arc-shaped protrusions facing inward.

FIG. 5 shows the valve housing designed as a guide cylinder according to section A—A in FIG. 1.

DETAILED DESCRIPTION OF THE INVENTION

Figure 6:
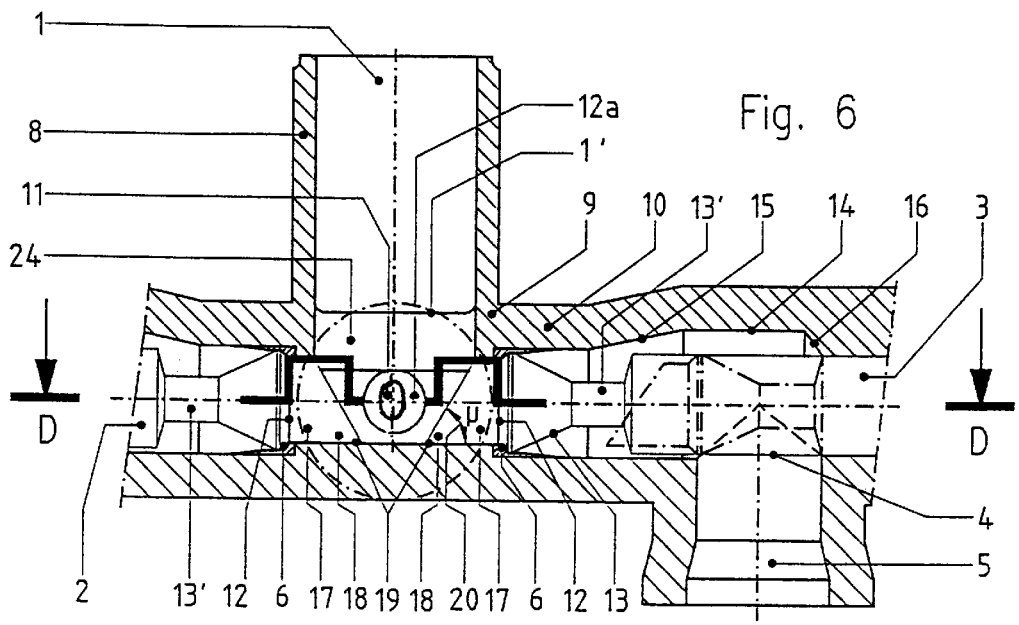
FIG. 6 shows the multiway valve according to FIG. 1 with the valve head of an additional valve body.

The present invention is a multiway valve consisting of
a) a fluid inlet line having a longitudinal axis and a fluid outlet,
b) a connector housing defining a flow channel,
c) two basic valve bodies and, optionally, up to two additional valve bodies, each valve body having a valve housing with a lateral discharge outlet, and each valve body having a longitudinal axis and a valve spindle with a valve head, the valve head of each basic valve body having a diameter "D" and the valve head of each additional valve body having a diameter "$D_A$",
d) a valve lantern attached to the valve head of each basic valve body,
wherein
i) the inlet line fluid outlet is connected to the connector housing and provides fluid connection between the inlet line and the connector housing,
ii) each valve housing is connected to the connector housing by a valve seat and defines a guide cylinder providing fluid connection between the connector housing and the valve housing lateral discharge outlet,
iii) each valve spindle is movably situated within the guide cylinder of each valve housing,
iv) the longitudinal axes of the basic valve bodies are exactly opposed to each other, at the level of the connector housing, perpendicular to the longitudinal axis of the inlet line at its fluid outlet, and perpendicular to the longitudinal axes of the additional valve bodies, if any,
v) the additional valve bodies, if any, are located co-planar to the basic valve bodies or, optionally, when there is only one additional valve body, beneath the connector housing with the longitudinal axis of the single additional valve body colinear with the longitudinal axis of the inlet line at its fluid outlet,
vi) the valve lanterns are in the form of a first straight cylinder with an attached second straight cylinder having an end opposite the valve head that is cropped at an inclined angle, the cylinders each having a longitudinal axis that is co-linear with the longitudinal axis of the corresponding valve spindle, with the longest side of the second straight cylinder furthest from the inlet line,
vii) on the valve head of each additional valve body is an attachment in the form of a straight cylinder with a front surface opposite the valve head that forms a cavity, curved inwards like the inner surface of a cylinder section,
viii) coaxially and entirely inside the cavity formed by the front surface of the attachment to the valve head of each additional valve body is a gable-roofed shaped wedge or a cone rounded at their bottom surfaces to attach flush to the front surface of the attachment, the gable of the wedge extending in a direction perpendicular to the longitudinal axis of said inner surface of a cylinder section,
ix) the inlet line at its fluid outlet is defined by two flattened walls opposed to each other and tapering in direction of the inlet line outlet, the flattened walls being parallel to the longitudinal axes of the basic valve bodies and connected by two concave walls, x) the portion of each valve spindle adjacent to its respective valve head has a diameter "d" for the basic valves and "$d_A$" for the additional valves that are 25% to 90% of the diameter "D" and "$D_A$", respectively, of the corresponding valve head, with a gradual transition from diameter D to diameter d and from $D_A$ to $d_A$, xi) the guide cylinder of each valve housing is enlarged on the side opposite the discharge outlet, with the transition to the enlarged portion being gradual, xii) each valve spindle is independently movable between (1) a closed position, wherein each valve head engages an annular valve seat positioned in the wall of the connector housing, and each valve lantern of the basic valve bodies is positioned beneath the inlet line outlet within the connector housing with its longest side abutting on the inner surface of the connector housing, and the curved front surface of each valve head attachment of the additional valve bodies runs flush with the inner surface of the connector housing, and (2) an open position, wherein the portion of each valve spindle with diameter d or $d_A$ is positioned at the valve body discharge outlet.

The multiway valve of the invention is employed mainly for viscous fluids that are usually under a pressure of 25 to 250 bar. The flow cross section of the inlet line is circular or oval before reaching the flattened zone at the fluid outlet. The fluid flows from the inlet line to the discharge outlet of each valve body being in the open position, i.e. the incoming flow is divided into 1 to 4 discharge streams or shut off depending on the number of valve bodies existing and being in the open position.

The straight cylinder and the attached straight cylinder cropped at an inclined angle of the valve lantern of the basic valve bodies have the same longitudinal axis. It is especially advantageous if the straight cylinder and the attached straight cylinder cropped at an inclined angle are made of a single part with a smooth transition and no sharp edges. The straight cylinder cropped at an inclined angle has the shape of a hoof.

The valve head attachment of each additional valve body is preferably circular in cross-section, but a slight oval cross-section is also possible. It is important, however, for the curved front surface of the valve head attachment to form a flush transition with the inner surface of the connector housing when the respective additional valve is in the closed position. The shape and particularly the depth of the cavity formed by the curved front surface is determined by the shape of the inner wall of the connector housing at the connecting site of the additional valve body. The gable-roofed wedge or the cone (with the gable extending in a direction opposite to the direction of flow) extends entirely within the cavity formed by the front surface of the valve head attachment. The bottom surface of the wedge or of the cone meets the shape of the curved front surface of the valve head attachment and is fixed to it. The edges of the wedge can be rounded, so that the cross-section approximately forms an oval. Instead of a gable-roofed wedge, it is also possible to lodge a straight cone with a circular or preferably an oval cross-section within the cavity, but the wedge is the preferred one.

As used herein, a "gradual transition" from one diameter to another means one in which the diameter is monotonically and continuously increasing or decreasing along the entire length. The longitudinal axis of a valve body is the line running centrally the length of that valve body and about which the valve spindle has rotational symmetry.

The initially circular or slight oval cross-section of the inlet line is gradually flattened on two opposed sides in the vicinity of the outlet of the inlet line, where the flattened sides are parallel to the longitudinal axes of the basic valve bodies. At the outlet the flattened sides are almost straight, whereas the non-flattened sides have still their initial circular or oval curved shape, the transition between both being smooth. Preferably each of the flattened sides has at the outlet of the inlet line a central arc-shaped protrusion pointing inward the inlet line. Then the flattened sides are not straight over the entire width, but straight or slightly concave curved at both sides and convex curved in their central part (concave and convex in respect of the interior of the inlet line). The convex curvature is less curved than the non-flattened sides.

It has been surprisingly found that dead zones (i.e., wherein there is no flow or a reduced flow) do not form in the multiway valve of the invention. The multiway valve is especially suitable for highly viscous fluids, such as polymer melts. Due to the arrangement of the flow channel, development of a continuously guided flow in the interior of the multiway valve is promoted, so that there is an increased flushing effect inside the multiway valve that can suppress the development of dead zones.

In a preferred embodiment of the present invention, the flow channel is positioned concentrally to the longitudinal axis of the inlet line and two opposing additional valve bodies are arranged so that their longitudinal axes are perpendicular to and co-planar with the longitudinal axes of the basic valve bodies. This arrangement of flow channel and valve bodies permits identical flow conditions upstream from the respective valve heads of each valve spindle. This is especially advantageous if it is necessary to divide highly viscous fluids into exactly equal substreams, as is the case, for example, with polymer melts that are to be supplied to spinning equipment.

According to another preferred embodiment of the present invention, the flow channel ist arranged non-centrically, and only one additional valve body is arranged so that its longitudinal axis is co-planar with that of the basic valve bodies and perpendicular to both the longitudinal axis of the inlet line and the longitudinal axes of the basic valve bodies. A non-centric arrangement is understood to be an arrangement in which the longitudinal axis of the flow channel forms an acute angle with the longitudinal axis of the inlet line or an arrangement in which the longitudinal axis of the flow channel is offset from the middle of the inlet line but is parallel to its longitudinal axis. The non-centric arrangement of the flow channel permits a tangential influx of fluids to the respective valve heads, which helps to prevent dead zones and promotes flushing of the multiway valve.

According to another preferred embodiment of this invention, the flow channel is arranged non-centrically and only one additional valve body is arranged on the side of the connector housing opposite the inlet line with its longitudinal axis co-linear with the longitudinal axis of the inlet line. The non-centric arrangement of the flow channel also permits an advantageous tangential influx of fluid to all basic valve bodies.

In another preferred embodiment of the present invention, the angle of taper of the two flat walls of the inlet line at its fluid outlet with the longitudinal axis of the inlet line is 5° to 25° (at the straight part of the flat walls). In this way the fluids are fed to the flow channel in an especially advantageous manner from the standpoint of flow, which promotes the setting of optimum flow conditions in the interior of the multiway valve.

According to one embodiment of this invention, the non-centric flow channel has a constant flow cross section over its length and is inclined to the longitudinal axis of the inlet line, with the angle of inclination between the longitudinal axis of the inclined flow channel and the longitudinal axis of the inlet line being 0.1° to 45°. If the angle of inclination is 0.1° to 45°, the tangential influx of fluids to the valve heads is increased, which has an advantageous effect on the setting of optimized flow conditions in the interior of the multiway valve. An angle of inclination of 1° to 8° easily guarantees a tangential influx of fluids even with basic valve bodies of different sizes.

Preferably the valve bodies are arranged symmetrically around the connector housing. However, according to another embodiment of this invention, the valve bodies can be arranged around the connector housing laterally offset to the inlet line, so that the longitudinal axes of the valve bodies do not intersect the longitudinal axis of the inlet line, but are still parallel to the longitudinal axes of the valve bodies, if these were not laterally offset. In this way, the valve bodies can be secured relatively easily even when the operating pressure in the multiway valve is below 25 bar, so that a relatively small thickness of the connector housing walls can be employed.

In another preferred embodiment of the present invention, the angle of inclination $\mu$ between the longest sideline and the top face of the straight cylinder cropped at an inclined angle is 30° to 60°. This promotes a homogeneous flow within the basic valve bodies when both basic valves are in the open position, and within the connector housing when at least one of the basic valves is in the closed position.

According to another preferred embodiment, the length of the portion of the valve spindles with reduced diameter d or $d_A$ is 0.3 to 1.2 times the diameter of the valve housing discharge outlet. By this and by the enlarged portion of the guide cylinder uniform flow conditions are established in the valve housing and at the discharge outlet.

According to another preferred embodiment of this invention, the widened diameter of the guide cylinder opposite the discharge outlet is 1.1 to 2 times the unwidened diameter. The length of the enlarged portion of the guide cylinder is 1 to 1.1 times the diameter of the discharge outlet. By this, zones of reduced flow and dead spots are avoided within the valve housings opposite to their discharge outlet. The total length of the guide cylinder depends on the length of the valve spindle and is proportionated to allow the valve head to be moved from its position in the valve seat to its position in the vicinity of the valves discharge outlet.

According to another preferred embodiment of the present invention, the flattened walls at the outlet of the inlet line have a central arc-shaped protrusion pointing inward the inlet line. In this case, the flow cross section at the outlet of the inlet line has the outskirt of a hour-glass. In this way, the direction of flow toward the valve heads of the basic valve bodies is increased, which also promotes the avoidance of low-flow zones.

According to another preferred embodiment of this invention, the height of the gable-roofed shaped wedge or of the conus is 0.5 to 0.9 times the depth of the cavity formed by the curved front surface of the attachment of the valve head of each additional valve body. This measure avoids stagnation of the fluids in the immediate vicinity of the valve heads within each of the cavities formed by the curved front surfaces of the attachments.

According to another preferred embodiment of this invention, the apex of the gable-roofed wedge or of the cones is rounded. This also increases the uniformity of the flow directly at the valve heads.

According to another preferred embodiment of this invention, the valve seat is tapered, gradually widening in a direction away from the connector housing at an angle $\phi$ of 3° to 5°. Then the throughput of fluids can be adjusted almost in proportion to the stroke of the respective valve spindle. This is especially advantageous if the fluids leaving the multiway valve must be conveyed further in accurately metered quantities.

The multiway valve of the present invention allows to divide a fluid stream, preferred a polymer melt stream into substreams. In dividing a polymer melt stream into substreams by prior art methods and apparatuses, the polymer is usually damaged repeatedly by decomposition products formed in low-flow zones. This damage is avoided with the multiway valve of the present invention, even if heated.

Depending on the nature of the fluid, the multiway valve can be heated. This can be accomplished by the arrangement of the multiway valve in a heated bath of thermal oils. However, it is also possible to have thermal oils flow along the outside of the multiway valve, for example by arranging the multiway valve in a suitable pipeline for the thermal oils.

The invention is explained in greater detail below on the basis of the drawings (FIGS. 1 through 8).

FIG. 1 shows the multiway valve for fluids with the basic valve bodies (2, 3) in cross section. For more clarity, no additional valve bodies are shown in FIG. 1. The basic valve bodies (2, 3) are arranged at the same plane, exactly opposite one another, and perpendicular to the longitudinal axis of the inlet line (1). The inlet line (1) opens with its outlet (1') in the underlying flow channel (24), arranged between the outlet (1') of the inlet line (1) and the inlets to the basic valve bodies (2, 3). The wall (8) of the inlet line (1) is connected directly to the wall of the connector housing (9). The basic valve bodies (2, 3) comprise each a valve housing (10) designed as a guide cylinder, and usually connected directly to the connector housing (9). It is possible, however, to manufacture the connector housing (9) and the valve housings (10) together as a single part, as illustrated in FIG. 1.

The basis valve bodies (2, 3) further comprise, each a valve spindle (13). The dotted lines display the valve spindle (13) of the basic valve body (3) when the basic valve is in the open position. A lantern (17, 18) in the form of a straight cylinder (17) with an attached straight cylinder (18) cropped at an inclined angle $\mu$ is arranged on each valve head (12) of each valve spindle (13) of the basic valve bodies (2, 3) with the longest side (19) of the straight cylinder (18) cropped at an inclined angle on the opposite side of the inlet line (1). The lantern (17, 18) is designed as a single part with the straight cylinder (17) and the attached cylinder (18) having a smooth transition with no edges. When the valve is in the closed position, the respective lantern (17, 18) is positioned directly below the flow channel (24) on the lower wall (20) of the connector housing.

The section (13') of the valve spindles (13) adjacent to the valve heads (12) has a diamenter "d" that is 25% to 90% of the diameter "D" of the valve heads (12), with a continous transition from diameter D to diameter d. When the basic valve is in the open position, section (13') is positioned in the area of the discharge outlet (4) of the respective valve which opens into an outlet line (5), as indicated by the dotted lines. The valve housing (10), which is designed as a guide cylinder, is widened on the side opposite the discharge outlet (4), with a continuous transition (15) to the widened area (14). In the end portion (16) of the guide cylinder, the widened area (14) is reduced again. Due to the arrangement of the straight cylinder (18) cropped at an inclined angle of the lantern, the enlarged guide cylinder and the reduced diameter of the valve spindle, the flow in the interior of each basic valve is particularly uniform, and low-flow zones or dead zones are prevented. Preferably the angle of inclination μ between the longest sideline and the top surface of the straight cylinder (18) of the lantern is 30° to 60°. Edges or steps between the straight cylinder (17) and the cropped straight cylinder (18) must be avoided.

When the basic valve is closed, the valve head (12) engages in a valve seat (6) which preferably is tapered with a wedge angle φ of 3° to 5°, as illustrated in FIG. 1a.

FIG. 2 shows a cross-sectional view of the multiway valve with the basic valve bodies (2, 3) through C—C of FIG. 1 (i.e., a longitudinal cross-section orthogonal to that of FIG. 1, but at a higher plane for the inlet line than the cross-sectional plane of the basic valve bodies), where the additional valve bodies have again not been shown. As shown in FIG. 2, the straight cylinders (18) cropped at an inclined angle are positioned directly beneath the flow channel (24) when the respective basic valves are closed. The inlet line (1) is flattened on both sides (22) parallel to the longitudinal axes of the basic valve bodies (2, 3) and tappers in the direction of the outlet (1') of the inlet line (1). The flow cross section is thus bordered at the outlet (1') of the inlet line (1) by two opposing flat edges (7) and by two opposing, almost arc-shaped edges (21), as shown in FIG. 4.

FIG. 3 shows the multiway valve in three embodiments according to cross section B—B in FIG. 1 with a straight and an inclined flow channel (24). In FIG. 3A (on the left side), the flow channel (24) is concentric to the longitudinal axis of the inlet line (1). The angle a between each of the two sides (22) of the flattened inlet line (1) and the longitudinal axis of the flattened inlet line (1) is 5° to 25°.

In FIGS. 3B and 3C, the flow channel (24) has a constant flow cross section over its length and runs at an inclination to the longitudinal axis of the inlet line (1). The angle of inclination β between the longitudinal axis of the inclined flow channel (24) and the longitudinal axis of the inlet line (1) ist 0.1° to 45°, and preferably between 1° and 8°. The fluids are thus conveyed through the flow channel (24) in such a manner that they flow tangentially to the basic valve heads. A tangential flow means that the initial direction of flow is not centrally, but tangentially in respect of the inlet (valve seat) of each basic valve body. This tangential flow can be increased by an additional arrangement of the longitudinal axes of the flow channel (24) (not shown) slightly offset from the center of the inlet line (1).

In FIG. 3C (on the right side) only one additional valve body (26') is arranged on the side of the multiway valve opposite the inlet line (1) and co-linear with the longitudial axis of the inlet line (1). In FIGS. 3A, 3B and 3C, the basic valve bodies (2, 3) and in FIG. 3B the additional valve bodies (25, 26) have been omitted entirely.

FIG. 4 shows a flow cross section at the outlet (1') of the inlet line (1) with (FIG. 4B) and without (FIG. 4A) arc-shaped protrusions (23) facing inward the inlet line. If arc-shaped protrusions (23) are provided, the flow cross section is thus bordered by two opposing, almost arc-shaped edges (21) and by two opposing flat edges (7) with a section at each of their centers that is virtually hyperbolic in shape. The ratio of distances a to b is approximately 1:3. As a result of this measure, the flow of fluids inside the multiway valve is increased in the direction of the basic valve bodies (2, 3) (not shown), which contributes to preventing or minimizing low-flow zones.

FIG. 5 shows the section through a valve housing (10) in the open position according to section A—A in FIG. 1 (i.e. orthogonal to the plane of paper and along the longitudinal axis of the outlet line (5)). On the side opposite the discharge outlet (4), the valve housing (10) is eccentrically widened (14). Concentric to the longitudinal axis of the valve the reduced part (13') of the valve spindle and the valve head (12) can be seen. The discharge outlet (4) opens directly into the outlet line (5).

FIG. 6 shows the multiway valve according to FIG. 1 with a valve head attachment (12a) of an additional valve body. The valve head attachment (12a) is circular in cross-section and includes a gable-roofed wedge (11) arranged with the gabled-roof facing pointing towards the oncoming flow at the center, with its curved base face flush and attached to the curved front-surface of the valve head (12).

Figure 7:
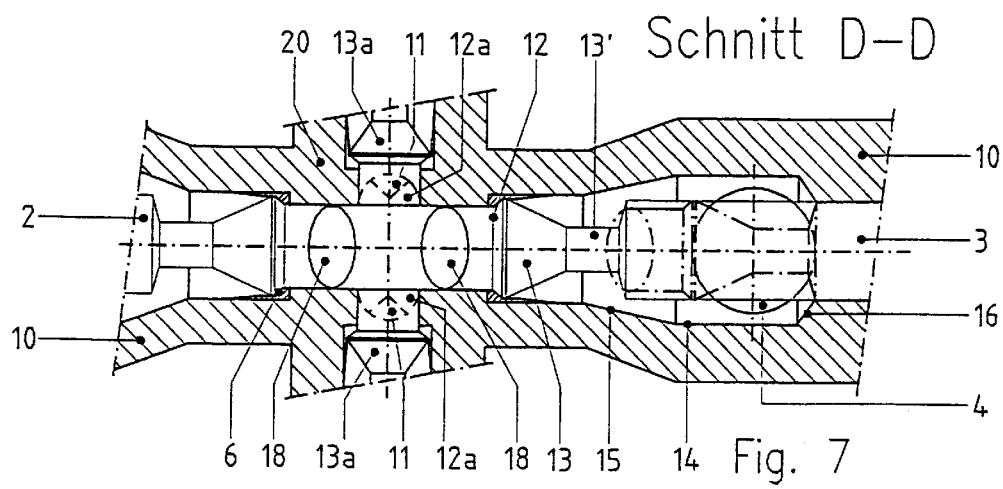
FIG. 7 shows the multiway valve according to section D—D in FIG. 6.

FIG. 7 shows the multiway valve according to section D—D (two different planes) in FIG. 6 with the valve heads attachments (12a) of two additional valves. The cylindrical front surface of the attachment (12a) and the wedge (11) can be seen.

Figure 8:
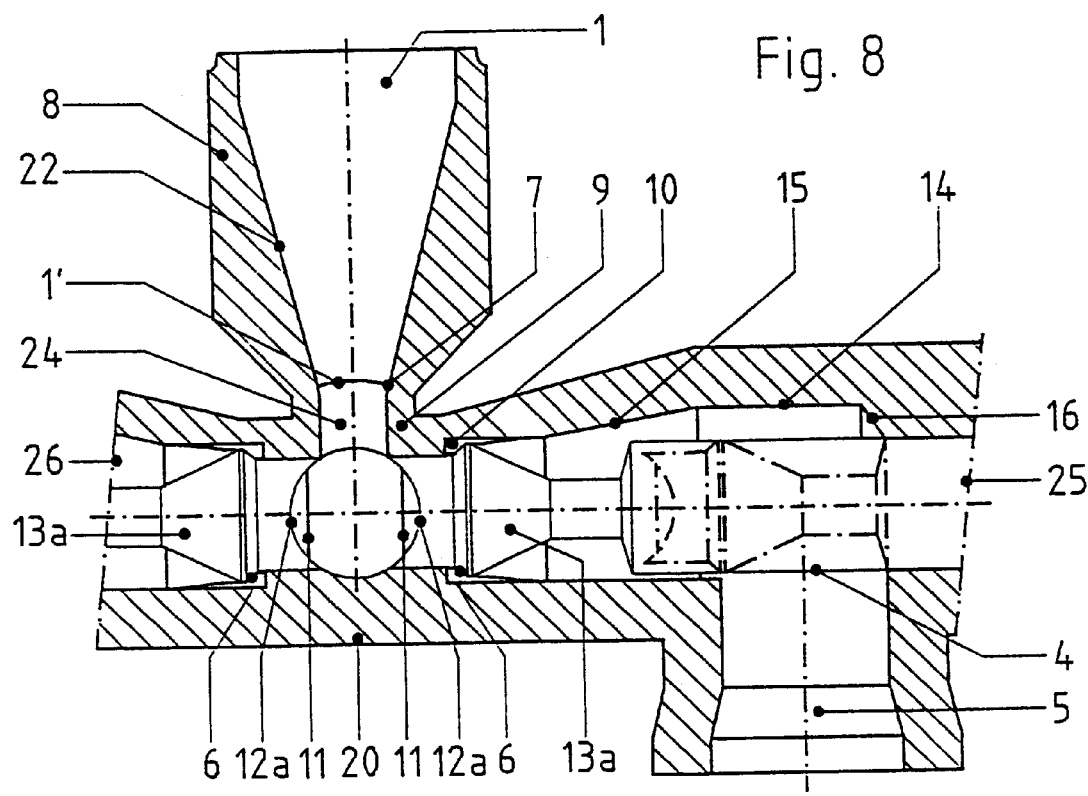
FIG. 8 shows a design variant of the multiway valve with two additional valve bodies according to section B—B in FIG. 1.

FIG. 8 shows a design variant of the multiway valve with two additional valve bodies according to section B—B in FIG. 1. The flow channel (24) is arranged centrally in the longitudinal direction of the inlet line (1) and two opposing additional valve bodies (25, 26) are arranged perpendicular to the longitudinal axis of the inlet line (1) and co-planar to the basic valve bodies (2, 3) (not shown). The front surface (12a) of the head attachment (12a) of each valve head (13a) of the additional valve bodies (25, 26) is cylindrically curved in shape and forms a cavity which includes a gable-roofed wedge (11) pointing towards the oncoming flow. The base face of the wedge (11) is facing the valve head attachment (12a), and flush with the curved front surface of the cavity (12a). Wedge (11) and valve head attachment (12a) may also be manufactured as a single part. The height of the gable-roofed wedge (11) is 0.5 to 0.9 times the depth of the cavity of the valve head attachment (12a) of each additional valve body (25, 26).

We claim:

1. A multiway valve consisting of
    a) a fluid inlet line having a longitudinal axis and a fluid outlet,
    b) a connector housing defining a flow channel,
    c) two basic valve bodies and, optionally, up to two additional valve bodies, each valve body having a valve housing with a lateral discharge outlet, and each valve body having a longitudinal axis and a valve spindle with a valve head, the valve head of each basic valve body having a diameter "D" and the valve head of each additional valve body having a diameter "$D_A$",
    d) a valve lantern attached to the valve head of each basic valve body,
wherein
    i) the inlet line fluid outlet is connected to the connector housing and provides fluid connection between the inlet line and the connector housing,
    ii) each valve housing is connected to the connector housing by a valve seat and defines a guide cylinder providing fluid connection between the connector housing and the valve housing lateral discharge outlet,
    iii) each valve spindle is movably situated within the guide cylinder of each valve housing,
    iv) the longitudinal axes of the basic valve bodies are exactly opposed to each other, at the level of the connector housing, perpendicular to the longitudinal axis of the inlet line at its fluid outlet, and perpendicular to the longitudinal axes of the additional valve bodies, if any, v) the additional valve bodies, if any, are located co-planar to the basic valve bodies or, optionally, when there is only one additional valve body, beneath the connector housing with the longitudinal axis of the single additional valve body colinear with the longitudinal axis of the inlet line at its fluid outlet, vi) the valve lanterns are in the form of a first straight cylinder with an attached second straight cylinder having an end opposite the valve head that is cropped at an inclined angle, the cylinders each having a longitudinal axis that is co-linear with the longitudinal axis of the corresponding valve spindle, with the longest side of the second straight cylinder furthest from the inlet line, vii) on the valve head of each additional valve body is an attachment in the form of a straight cylinder with a front surface opposite the valve head that forms a cavity, curved inwards like the inner surface of a cylinder section, viii) coaxially and entirely inside the cavity formed by the front surface of the attachment to the valve head of each additional valve body is a gable-roofed shaped wedge or a cone rounded at their bottom surfaces to attach flush to the front surface of the attachment, the gable of the wedge extending in a direction perpendicular to the longitudinal axis of said inner surface of a cylinder section, ix) the inlet line at its fluid outlet is defined by two flattened walls opposed to each other and tapering in direction of the inlet line outlet, the flattened walls being parallel to the longitudinal axes of the basic valve bodies and connected by two concave walls, x) the portion of each valve spindle adjacent to its respective valve head has a diameter "d" for the basic valves and "$d_A$" for the additional valves that are 25% to 90% of the diameter "D" and "$D_A$" respectively, of the corresponding valve head, with a gradual transition from diameter D to diameter d and from $D_A$ to $d_A$, xi) the guide cylinder of each valve housing is enlarged on the side opposite the discharge outlet, with the transition to the enlarged portion being gradual, xii) each valve spindle is independently movable between (1) a closed position, wherein each valve head engages an annular valve seat positioned in the wall of the connector housing and each valve lantern of the basic valve bodies is positioned beneath the inlet line outlet within the connector housing with its longest side abutting on the inner surface of the connector housing, and the curved front surface of each valve head attachment of the additional valve bodies runs flush with the inner surface of the connector housing, and (2) an open position, wherein the portion of each valve spindle with diameter d or $d_A$ is positioned at the valve body discharge outlet.

2. The multiway valve according to claim 1 wherein the flow channel is co-linear with the longitudinal axis of the inlet line, and two opposing additional valve bodies are arranged perpendicular to the longitudinal axis of the inlet line and perpendicular to and co-planar with the longitudinal axes of the basic valve bodies.

3. The multiway valve according to claim 1 wherein the flow channel is arranged non-centrically, and only one additional valve body is positioned perpendicular to the longitudinal axis of the inlet line and perpendicular and co-planar with the longitudinal axes of the basic valve bodies.

4. The multiway valve according to claim 1 wherein the flow channel is arranged non-centrically, and only one additional valve body is positioned opposite the inlet line and co-linear with the longitudinal axis of the inlet line.

5. The multiway valve according to claim 1 wherein the angle between each of the two flattened sides of the inlet line and the longitudinal axis of the inlet line is 5° to 25°.

6. The multiway valve according to claim 3 or 4 wherein the flow channel has a constant flow cross section over its length and its longitudinal axis at an angle of 0.1° to 45° with the longitudinal axis of the inlet line.

7. The multiway valve according to claim 6 wherein the angle is 1° to 8°.

8. The multiway valve according to claim 1 wherein the valve bodies are laterally offset with respect to the inlet line such that the longitudinal axes of the valve spindles do not intersect the longitudinal axis of the inlet line.

9. The multiway valve according to claim 1 wherein the angle of inclination between the longest side and the top face of the straight cylinder cropped at an inclined angle is 30 to 60°.

10. The multiway valve according to claim 1 wherein the length of the region of the valve spindles with reduced diameter d or $d_A$ is 0.3 to 1.2 times the diameter of the lateral discharge outlet of the respective valve body.

11. The multiway valve according to claim 1 wherein the widened diameter of the valve housing opposite the discharge outlet is 1.1 to 2 times the unwidened diameter.

12. The multiway valve according to claim 1 wherein the length of the region with widened diameter of the valve housing opposite the discharge outlet is 1.0 to 1.1 times the diameter of the discharge outlet of the respective valve body.

13. The multiway valve according to claim 1 wherein the flattened walls of the inlet line have an arc-shaped protrusion facing inward.

14. The multiway valve according to claim 1 wherein the height of the gable-roofed wedge or of the cone is 0.5 to 0.9 times the depth of the cavity formed by the curved front surface of the attachment to the valve head.

15. The multiway valve according to claim 1 wherein the apex of the gable-roofed wedge or of the cone is rounded.

16. The multiway valve according to claim 1 wherein the valve seat is tapered at an angle of 3° to 5°.

* * * * *